March 4, 1947.   J. C. TELLIER   2,416,780
ELECTROSTATIC METER SHIELD
Filed Dec. 31, 1943

INVENTOR.
Joseph C. Tellier
by his Attorneys
Howson & Howson

Patented Mar. 4, 1947

2,416,780

UNITED STATES PATENT OFFICE 2,416,780

ELECTROSTATIC METER SHIELD

Joseph C. Tellier, Drexel Hill, Pa., assignor to Philco Corporation, Philadelphia, Pa., a corporation of Pennsylvania Application December 31, 1943, Serial No. 516,524

4 Claims. (Cl. 171—95)

1

The present invention relates to electrical indicating instruments or meters and more particularly to a method and arrangement for eliminating error due to the effects of electrostatic fields under certain conditions where indicating meters or instruments are used in high voltage circuits.

In certain electrical apparatus it is necessary to provide indicating instruments or meters to indicate the magnitude of the electrical current in a high potential portion of the circuit. In the past, in order to protect the operator from electrical shock, such meters have been mounted slightly in back of the front panel of the apparatus. The meter was frequently supported from a subpanel and the entire meter enclosed in a metal box or housing conductively connected to the high potential side of the circuit in which the meter is connected. The purpose of the metal box connected to the high potential side of a circuit was to eliminate the undesirable effects of strong electrostatic fields which result from the meter being in close proximity to the metal panel of the apparatus, which panel is at ground potential. It will be understood that where very sensitive meters are employed, e. g., meters designed to indicate currents of the order of microamperes, strong electrostatic fields may easily produce very appreciable deflections of the indicating pointer, e. g., of the order of 10% of full scale.

In order that the high potential housing about the meter may not be a hazard to the operator or repair technician, the high potential housing is usually surrounded by a larger metallic shield or casing which is maintained at ground potential. In providing the larger grounded shield, great care must be taken to avoid electrical break down between it and the high potential housing. In addition there is present a hazard whenever the ground shield is left off accidentally. Therefore it has been found desirable to provide an improved arrangement which is less bulky, which minimizes the electrical break down danger, and which also minimizes the hazard brought about by accidentally leaving off the ground shield.

In accordance with the present invention, means are provided for eliminating the deleterious effects of electrostatic fields on the moving elements of the meter. The elimination of these effects is attained through the agency of novel and greatly simplified means for substantially eliminating the electrostatic field in the immediate region of said moving elements.

2

It therefore is an object of the present invention to provide an improved method and an arrangement for eliminating the deleterious effects of electrostatic fields where the current indicating instrument is mounted in close proximity to a structure whose electrical potential differs considerably from the potential of the instrument.

It is another object of the present invention to provide an improved arrangement for eliminating the effects of electrostatic fields on instruments used at high potentials where such instruments are mounted adjacent to low potential objects.

Other and further objects of the present invention subsequently will become apparent by reference to the following description taken in connection with the accompanying drawing, wherein.

Figure 2:
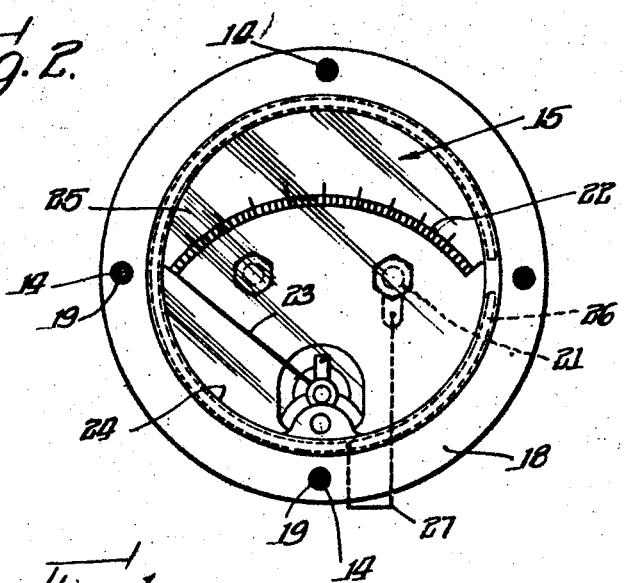
Figure 2 is a front view of an instrument illustrating certain essential parts thereof.
Figure 3:
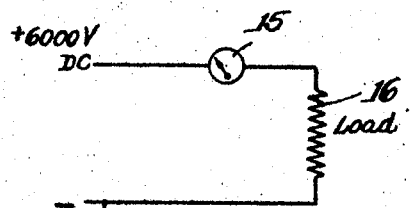
Figure 3 is a circuit diagram indicating the position in an electrical circuit in which an indicating instrument might be used at high potential.

Referring to the drawing, it will be seen that there has been shown a portion of a panel 11 forming part of a housing or support for an electrical apparatus. The panel 11 is at ground potential as is customary and may be provided with suitable apertures for receiving indicating instruments, or for viewing indicating instruments mounted in back of the panel. Accordingly, there has been shown one such aperture 12 which may be provided with a glass window 13. Supported in back of the aperture 12 by suitable studs or mounting members 14 is an indicating instrument 15, the front of which is illustrated in Figure 2. The instrument 15 is of the current indicating type and may be connected in a circuit, such as shown in Figure 3, so as to be in series with a load 16 and arranged between the high potential (ungrounded) end of the load and the high potential (ungrounded) side of a suitable source of high voltage. In one embodiment in which the invention was utilized, a potential of 6000 volts was applied to the circuit.

The instrument 15 may be of the type having an insulated casing 17 provided with a mounting flange 18 having suitable apertures 19 therein so that fastening means may be used with the mounting studs 14 to support the instrument 15 a short distance in back of the front panel 11.

At the back of the casing 17 there are provided two terminals 21 for connecting the instrument in a circuit, such as shown in Figure 3. The instrument is provided with a dial 22 for cooperation with an indicating pointer 23 which is actuated by the operating mechanism suitably supported within the housing 17. The dial 22 is visible through a window 24 which is provided with a dial glass 25 which may be retained in position by a metal ring 26. In the present instance the metal ring 26 has been shown as being of the split resilient wire ring type, but it is to be understood that other forms of rings, such as those which are continuous and which frictionally engage the inner surface of the housing 17 to retain the dial window glass 25 in position, may be used. In the arrangement as described so far, a very strong electrostatic field would exist between the moving elements of the meter (e. g. the moving coil, pointer, etc.) and the grounded metal panel 11. This field gives rise to relatively strong electrostatic forces between the moving elements and the panel, and may cause movements of the pointer which frequently are of the order of 10% of full scale.

In order to eliminate the deleterious effects of electrostatic fields caused by mounting the indicating instrument 15 in close proximity to the grounded front panel 11, the retaining ring 26 is conductively connected by a suitable conductor means 27 to one terminal 21 of the instrument. Since the impedance of the instrument is relatively small it is usually immaterial which terminal is selected for this connection. By interposing between the operating mechanism of the instrument 15 and the grounded panel 11 a ring, such as 26, (which may be the retaining ring or an auxiliary ring provided for that purpose) connected to the high potential side of the circuit, the detrimental effects of the electrostatic field are eliminated. It will be observed that this is accomplished by eliminating the high intensity electrostatic field in the region of the moving elements of the meter. The field still exists, of course, but is confined generally to the space between the ring 26 and the panel 11. It has been found that in practice the shielding effects of the ring 26 are entirely adequate, and substantially identical to the shielding effects of the high potential housing previously utilized and described hereinbefore.

In order to provide protection to the operator or to the repair technician, the indicating instrument 15 is preferably surrounded by a grounded shield or housing 28 which may be secured to the grounded panel 11 by any suitable means. It will be apparent that the grounded shield 28 is not nearly as large as the grounded shields heretofore required for housing the instrument together with its high potential shield, and consequently there is less likelihood of any need for removing the shield when access is needed to the apparatus adjacent to the meter. It will be appreciated that the present arrangement is more compact, and that it minimizes the hazard which occurred heretofore when the grounded shield was removed, and where the repair technician failed to identify the inner shield as being at high potential. Thus in the illustrated embodiment the conductor 27 is clearly visible throughout its entire "touchable" length, and even the most cursory inspection will disclose the fact that it is connected to a high potential point. On the other hand, referring to the prior art, large shields are almost always at ground potential, and when they are not, the connection to high voltage may be inconspicuous or even invisible.

Figure 1:
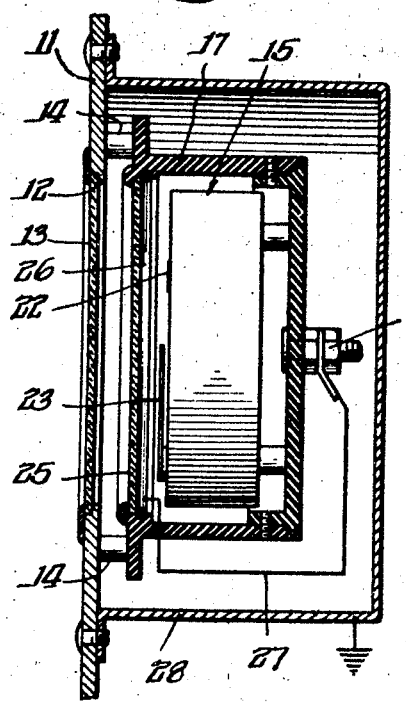
Figure 1 is a cross-sectional view of an arrangement embodying the present invention.

In the preferred embodiment of the invention, as illustrated in Figures 1 and 2, the high potential shielding ring 26 extends around substantially the entire perimeter of the indicating instrument. Experiment has shown that while this is convenient mechanically it is not at all necessary. Thus a high potential member extending only, say, half-way around the meter's perimeter is frequently sufficient to eliminate appreciable errors in meter reading. Alternatively a small metal bar or plate may be interposed between the plane of the panel 11 and the moving elements of the meter. This bar or plate may be of sufficiently small dimensions that at least the major portion of the pointer 23 is not obscured thereby. Speaking generally, the function of the ring, bar, or plate, is simply to reduce the gradient of the electrostatic field, in the immediate vicinity of the meter's moving elements, to such an extent that the electrostatic forces remaining are insufficient to cause appreciable deflection of the pointer.

In the schematic diagram of Figure 3, the instrument 15 is shown in the positive high voltage portion of the circuit, the negative terminal being grounded. It will be obvious, of course, that in other applications it may be desired to connect the positive terminal of the source to ground, and to connect the meter 15 in the negative high voltage portion of the circuit.

While for the purpose of illustrating and describing the present invention, a specific instrument and arrangement thereof has been shown, it is to be understood that this is not intended to constitute a limitation of the invention since obviously other types of instruments and mounting arrangements may be used without departing from the spirit and scope of the invention as set forth in the appended claims.

I claim:

1. The combination comprising a current indicating meter, having moving elements, adapted to be connected in a high potential circuit, said meter being mounted adjacent to a low potential object and therefore being subjected to an electrostatic field, a conducting member forming part of the meter assembly interposed between said low potential object and the moving elements of said meter, and a connection between one of the terminals of said meter and said conducting member, whereby the deleterious effects of said field on said meter are substantially eliminated.

2. An electric meter for use in a high potential circuit and adapted to be mounted on a low potential support, said meter comprising moving elements and a casing or housing for the meter parts including the moving elements, a pair of terminals mounted on said casing for connecting said meter in said circuit, a conducting member supported in a position such that it will be interposed between the low potential support and the moving meter elements when the meter is mounted on the support, and means connecting said conducting member to one of said terminals.

3. In combination, an electric meter for use in a high potential circuit, a low potential support for said meter, said meter comprising moving elements and a casing or housing for the meter parts including the moving elements, a pair of terminals mounted on said casing for connecting said meter in said circuit, a conducting member supported within said casing in a position such that it is interposed between the low potential support and the moving meter elements, means connecting said conducting member to one of said terminals, and shielding means surrounding said meter and maintained at a low potential.

4. The combination comprising a current indicating instrument connected in a high potential circuit, said instrument being mounted adjacent to a low potential or grounded object and therefore being subjected to an electrostatic field, said instrument having an insulating case, a dial window including a transparent member, a metal ring for retaining said member in position, a pair of terminals for connecting said instrument in said circuit, and a conductive connection between said ring and one of said terminals, whereby the deleterious effects of said field on said instrument are substantially eliminated.

JOSEPH C. TELLIER.

REFERENCES CITED

The following references are of record in the file of this patent:

UNITED STATES PATENTS

| Number | Name | Date |
| --- | --- | --- |
| 546,802 | Ayrton et al | Sept. 24, 1895 |
| 1,693,072 | De Forest | Nov. 27, 1928 |
| 1,875,968 | Weeber | Sept. 6, 1932 |
| 1,162,419 | Van Deventer | Nov. 30, 1915 |
| 1,502,924 | Stanley | July 29, 1924 |
| 1,545,672 | McArthur | July 14, 1925 |
| 2,331,747 | Tillander | Oct. 12, 1943 |
| 2,238,298 | Wehrlin | Apr. 15, 1941 |